US012743505B2

(12) United States Patent
Jayaraman et al.

(10) Patent No.: US 12,743,505 B2

(45) Date of Patent: Sep. 22, 2026

(54) SYSTEMS AND METHODS FOR PROVIDING A FRAUD MODEL FOR PROACTIVELY PREVENTING ATTACKS ON MACHINE LEARNING MODELS

(71) Applicant: Verizon Patent and Licensing Inc., Basking Ridge, NJ (US)

(72) Inventors: Srilakshmi Jayaraman, Chennai (IN); Aiswarya Devarajan, Chennai (IN); Padma Rangarajan, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 30 days.

(21) Appl. No.: 18/917,363

(22) Filed: Oct. 16, 2024

(65) Prior Publication Data

US 2026/0105144 A1 Apr. 16, 2026

(51) Int. Cl.
*G06F 21/55* (2013.01)

(52) U.S. Cl.
CPC ...... *G06F 21/552* (2013.01); *G06F 2221/034* (2013.01)

(58) Field of Classification Search
CPC ......................... G06F 21/552; G06F 2221/034
See application file for complete search history.

(56) References Cited

U.S. PATENT DOCUMENTS

2019/0334547 A1* 10/2019 van Schuppen .... H03M 7/3057
2022/0103589 A1* 3/2022 Shen ........................ G06N 5/01
2022/0138753 A1* 5/2022 Wright ............... G06Q 20/4016 705/44
2023/0281281 A1* 9/2023 Sankaranarayanan ....................... G06N 20/00
2023/0385849 A1* 11/2023 Stacy-Nieto ........... G16H 10/60
2024/0311834 A1* 9/2024 Perez ................... G06Q 20/383
2024/0411896 A1* 12/2024 Myers ................... G06F 21/552
2025/0053664 A1* 2/2025 Cameron .............. G06F 21/552
2025/0190884 A1* 6/2025 Silver ....................... G06F 8/60
2025/0211579 A1* 6/2025 Rosenoer ................ H04L 41/16
2025/0371165 A1* 12/2025 Cui ....................... G06F 21/577

* cited by examiner

*Primary Examiner* — Mudasiru K Olaegbe

(57) ABSTRACT

A device may perform adversarial training of a fraud model based on a primary model and with different training data than used to train the primary model, and may receive, from a user, a request for the primary model to generate a prediction. The device may cause the request to be processed by the primary model for generation of a primary model prediction, and may process the request, with the fraud model, to generate a fraud model prediction. The device may perform a comparison analysis of the primary model prediction and the fraud model prediction to generate results, and may determine metadata and relationships based on the primary model prediction, the fraud model prediction, and user behavior patterns. The device may calculate a risk score for the primary model prediction based on the results, the metadata, and the relationships, and may perform actions based on the risk score.

20 Claims, 9 Drawing Sheets

Figure 1B:
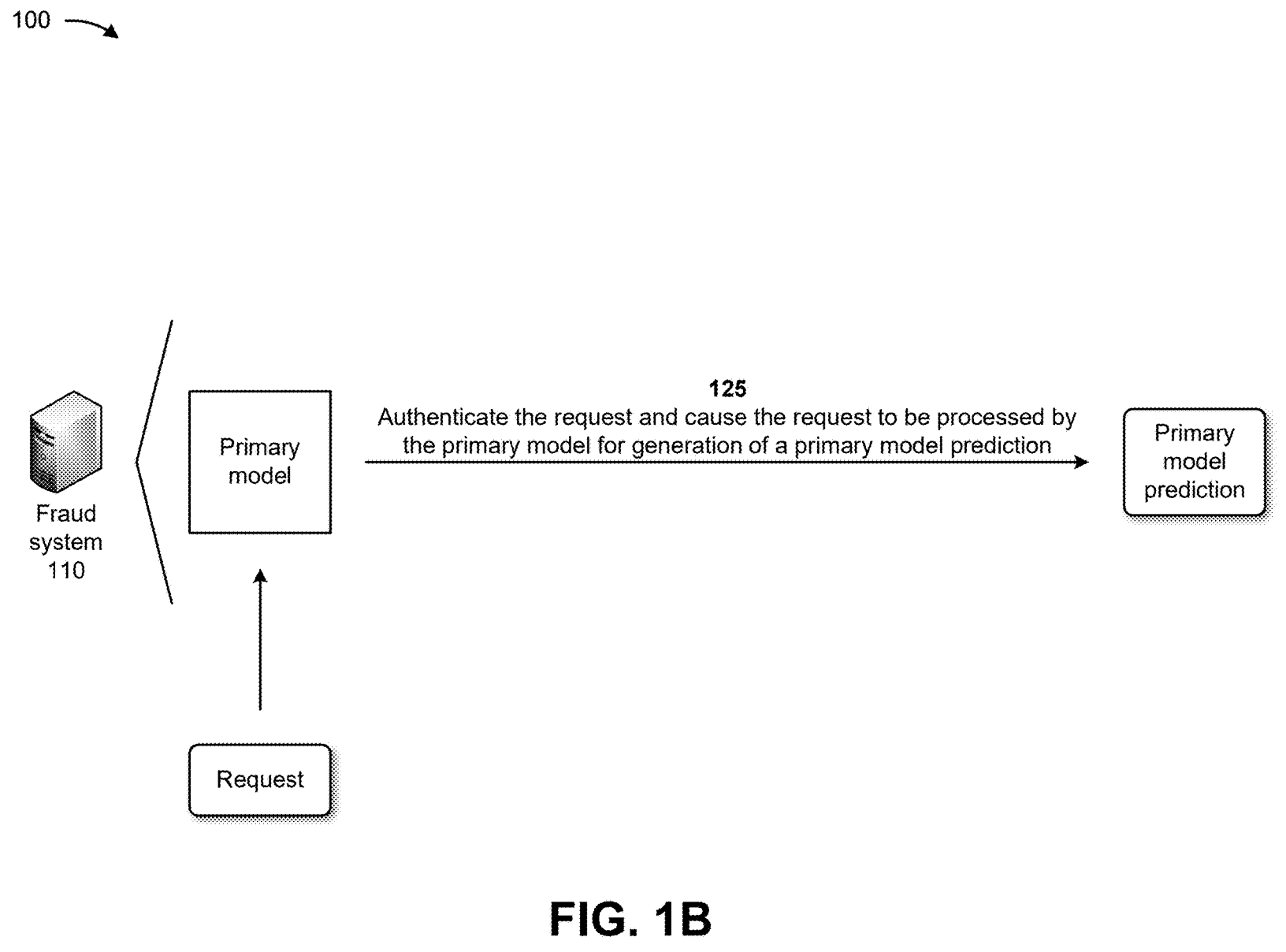

100

Fraud system 110

Primary model

Request

125
Authenticate the request and cause the request to be processed by the primary model for generation of a primary model prediction Primary model prediction

Figure 1C:
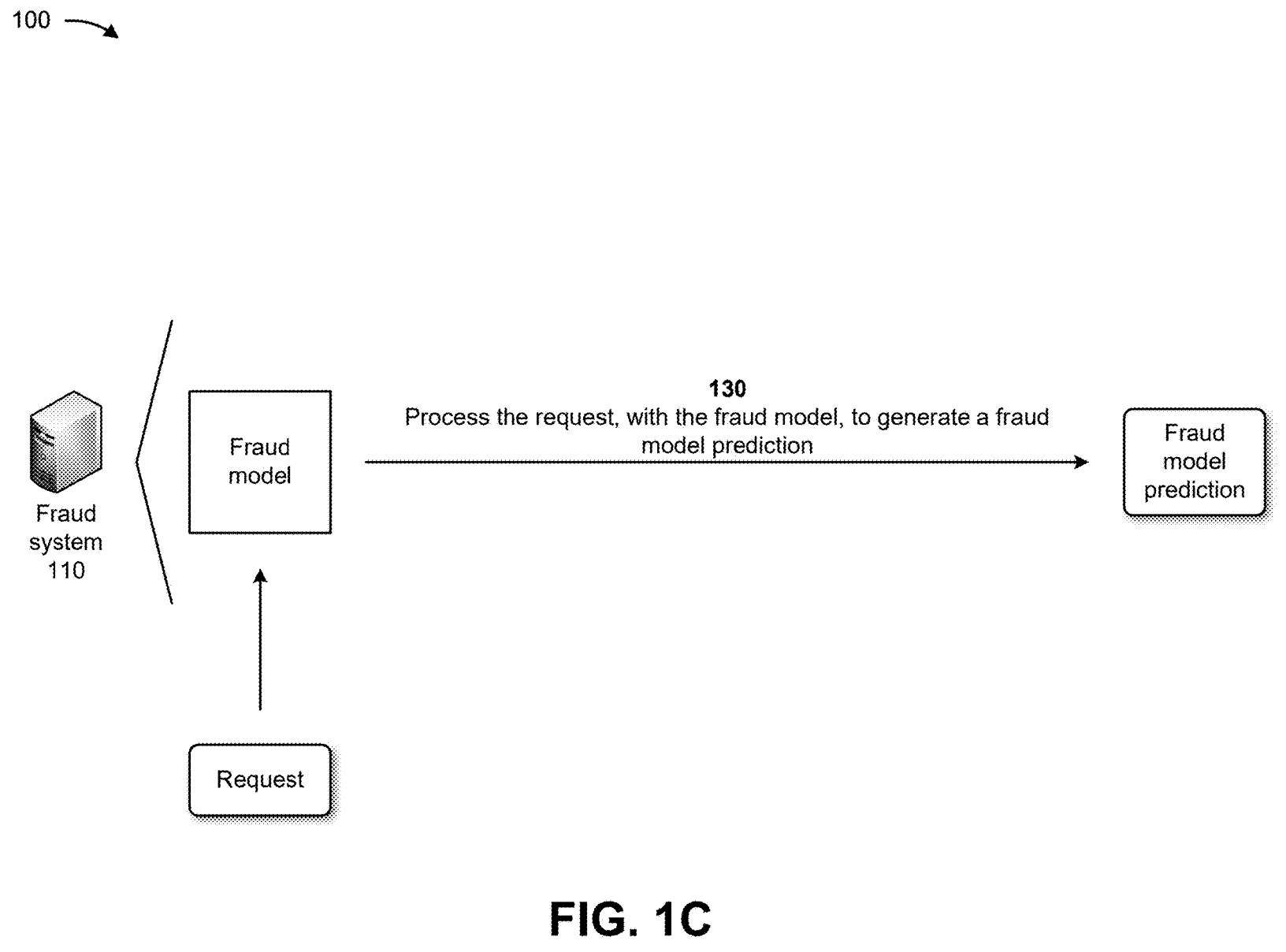

Fraud system 110

Fraud model

Request

130
Process the request, with the fraud model, to generate a fraud model prediction Fraud model prediction

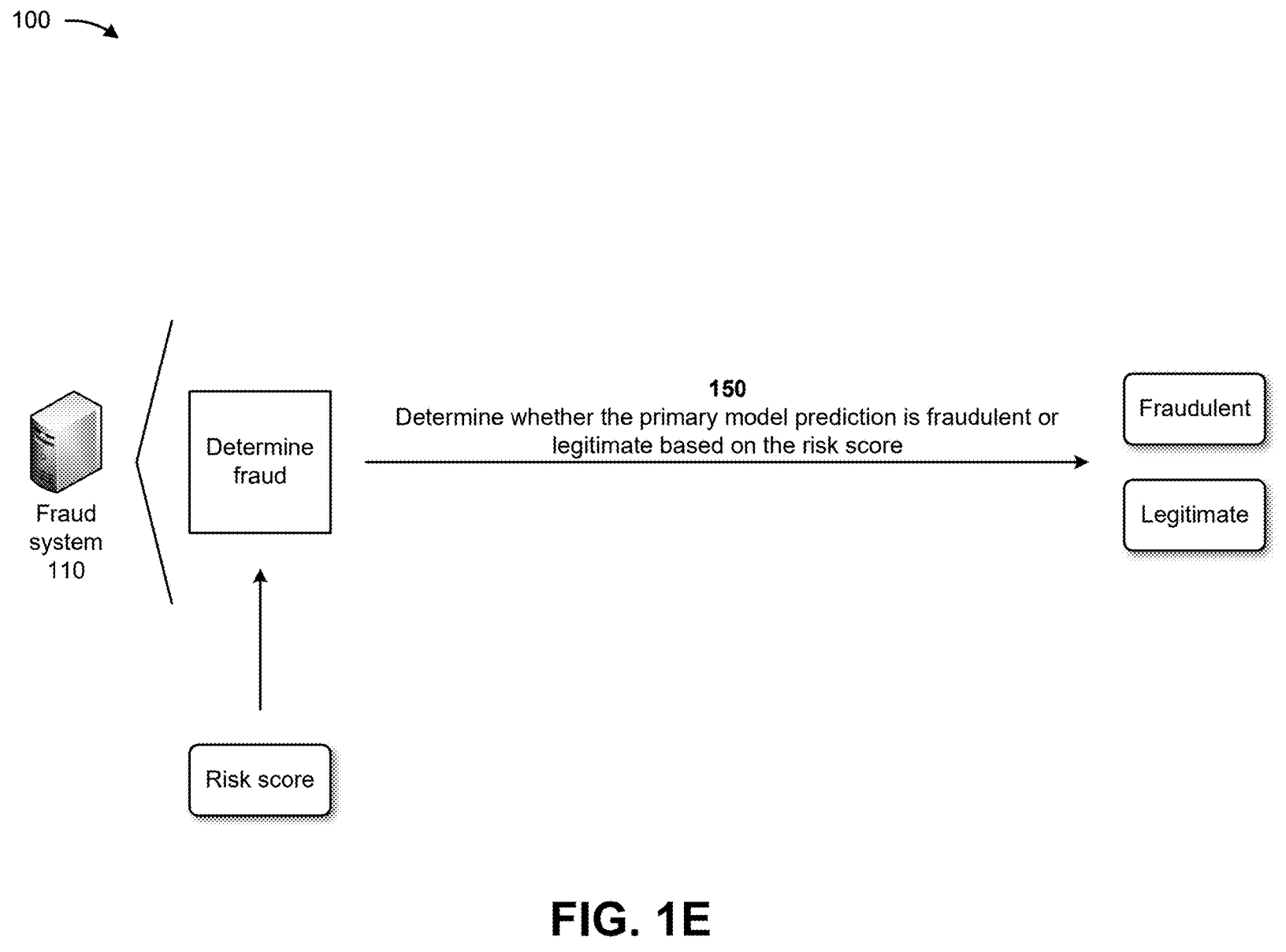

Fraud system 110

Determine fraud

Risk score

150
Determine whether the primary model prediction is fraudulent or legitimate based on the risk score Fraudulent Legitimate

FIG. 1E

SYSTEMS AND METHODS FOR PROVIDING A FRAUD MODEL FOR PROACTIVELY PREVENTING ATTACKS ON MACHINE LEARNING MODELS

BACKGROUND

Artificial intelligence (AI) has increasingly become a cornerstone of modern technological ecosystems, particularly as industries integrate machine learning models to drive innovation and efficiency.

BRIEF DESCRIPTION OF THE DRAWINGS

FIGS. 1A-1F are diagrams of an example associated with providing a fraud model for proactively preventing attacks on machine learning models.

DETAILED DESCRIPTION OF EXAMPLE EMBODIMENTS

Figure 1A:
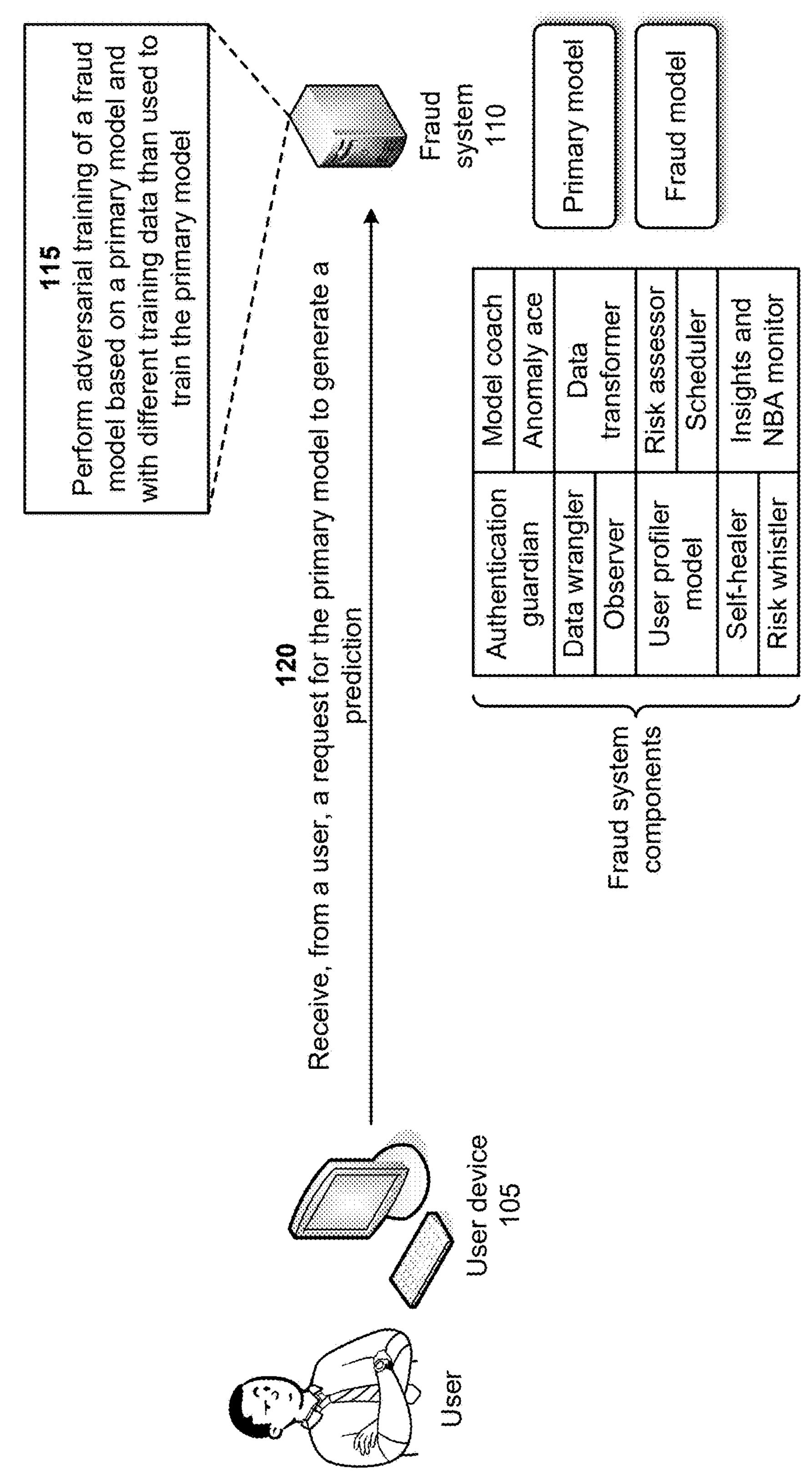

The following detailed description of example implementations refers to the accompanying drawings. The same reference numbers in different drawings may identify the same or similar elements.

The proliferation of AI technologies has given rise to sophisticated AI-assisted cyber threats that attempt to compromise the integrity, accuracy, and stability of machine learning models. These threats may include data poisoning, model inversion, adversarial attacks, and insertions of backdoors, and are designed to manipulate machine learning models. Cybercriminals may also utilize the emerging techniques to bypass ethical policies, launch social engineering or phishing attacks, and utilize AI-assisted methods to disassemble and reconstruct executable malware. In response, industries have adopted measures, such as model hardening controls, data encryption, and regular security audits, to safeguard against such threats. However, the adopted measures are failing and industries are experiencing financial losses, legal implications, erosion of customer trust, and decline in competitive market share due to the sophisticated AI-assisted cyber threats. Furthermore, retraining and repairing compromised machine learning models is expensive and results in downtime for the machine learning models.

Thus, current techniques for handling sophisticated AI-assisted cyber threats consume computing resources (e.g., processing resources, memory resources, communication resources, and/or the like), networking resources, and/or other resources associated with failing to stop the sophisticated AI-assisted cyber threats from compromising machine learning models, retraining the compromised machine learning models, handling customer complaints associated with downtime for the compromised machine learning models, generating erroneous predictions with the compromised machine learning models, and/or the like.

Some implementations described herein provide a device (e.g., a fraud system) that provides a fraud model for proactively preventing attacks on machine learning models. For example, the fraud system may perform adversarial training of a fraud model based on a primary model and with different training data than used to train the primary model, and may receive, from a user, a request for the primary model to generate a prediction. The fraud system may cause the request to be processed by the primary model for generation of a primary model prediction, and may process the request, with the fraud model, to generate a fraud model prediction. The fraud system may perform a comparison analysis of the primary model prediction and the fraud model prediction to generate results, and may determine metadata and relationships based on the primary model prediction, the fraud model prediction, and user behavior patterns. The fraud system may calculate a risk score for the primary model prediction based on the results, the metadata, and the relationships, and may perform actions based on the risk score.

In this way, the fraud system provides a fraud model for proactively preventing attacks on machine learning models. For example, the fraud system may provide real-time analysis of potential threats or anomalies to a primary model (e.g., a machine learning model potentially under attack) based on comparing predictions from the primary model and predictions from a fraud model. The fraud system may utilize user behavior patterns and metadata for enhanced risk assessment, which serves to maintain integrity and predictive accuracy of the primary model in the face of advanced cyber threats. The fraud system may preserve computational integrity of the primary model, may prevent unauthorized manipulations of the primary model, and may avert excessive resource drain caused by threat mitigation and recovery processes. The fraud system may reject or accept primary model predictions based on a risk assessment, and may apply corrective actions to the primary model based on the risk assessment. Thus, the fraud system may conserve computing resources, networking resources, and/or other resources that would have otherwise been consumed by failing to stop the sophisticated AI-assisted cyber threats from compromising machine learning models, retraining the compromised machine learning models, handling customer complaints associated with downtime for the compromised machine learning models, generating erroneous predictions with the compromised machine learning models, and/or the like.

FIGS. 1A-1F are diagrams of an example 100 associated with providing a fraud model for proactively preventing attacks on machine learning models. As shown in FIGS. 1A-1F, the example 100 includes a user device 105 associated with a user and a fraud system 110. Further details of the user device 105 and the fraud system 110 are provided elsewhere herein. In some implementations, one or more of the functions described herein as being performed by the fraud system 110 may be performed by the user device 105.

As shown in FIG. 1A, the fraud system 110 may be associated with a primary model (e.g., a machine learning model, such as a large language model (LLM)) and a fraud model (e.g., a neural network model). The fraud system may also include multiple components, such as an authentication guardian, a model coach, an anomaly ace, a data wrangler, a data transformer, an observer, a user profiler model, a risk assessor, a self-healer, a scheduler, an insights and next best action (NBA) monitor, and a risk whistler. As used herein, the term "component" is intended to be broadly construed as hardware, firmware, or a combination of hardware and software utilized by the fraud system 110. It will be apparent that the fraud system 110 described herein may be implemented in different forms of hardware, firmware, and/or a combination of hardware and software.

The authentication guardian may provide authentication and role-based security access to the fraud system 110. The model coach may train the fraud model based on the primary model, with deviations in training data and with a different LLM with a different transformer and hyperparameters. The anomaly ace may provide adversarial training of the fraud model against cyberattacks, such as jailbreaking; trigger insertion; open worldwide application security project (OWASP) threats; spoofing, tampering, repudiation, information disclosure, denial of service, and elevation of privilege (STRIDE) threats; backdoor attacks; first gradient sign method (FGSM); projected gradient descent (PGD); and/or the like. The adversarial training may be applied to most consumer-based applications to ensure that the fraud model provides accurate recommendations, price predictions, text-based searches, and/or the like.

The data wrangler may collect transaction data from various sources, such as a security data lake with logs from all levels (e.g., including telemetry traces, application programming interface (API) logs, and/or the like). The data wrangler may retrieve supporting metrics from the primary models and other components of the fraud system 110. One capability of the data wrangler is to gather data focused on cyber threats, including recent attacks and vulnerabilities.

The data transformer may clean and format data required for analytics, and may provide the cleaned and formatted data to the risk assessor. The observer may compare predictions of the primary model and may determine an accuracy, a precision, a sensitivity, an F1 score (e.g., a machine learning evaluation metric that measures a model's accuracy), a mean absolute error, and a mean squared error against historical predictions and based on predictions by fraud model. The observer may provide results of the comparison to the risk assessor.

The user profiler model may create profiles based on user behavior, may identify inconsistencies, such as a sudden change in a location or a user device, and may flag deviations that may indicate fraud. The user profiler model may provide outputs to the risk assessor. The user profiler model may collect user data, such as user interactions (e.g., login history, actions performed, telemetry information, and/or the like), user demographics, and profile information. The user profiler model may convert the user data into numerical embeddings that capture behavior patterns. The numerical embeddings may serve as inputs for assessing and predicting a legitimacy of a prompt of the primary model.

The risk assessor may execute a risk-assessment model and may compute a risk score based on a canonical covariance analysis of predictions of the primary model and the fraud model, and based on metadata and relationships determined based on primary model predictions, user profiler behavior patterns, and fraud model predictions. A risk score may be in a range of 0-1, with 0.1-0.3 indicating a high-risk transaction, 0.4-0.8 indicating a low-risk transaction, and 0.9-1.0 indicating a legitimate transaction. The risk assessor may compare the risk score against one or more predefined risk thresholds, and may categorize the risk (e.g., low risk, medium risk, or high risk) based on the comparison. The risk assessor may receive health parameters of the primary model (e.g., from the observer). The health parameters may include an accuracy of the primary model, a precision of the primary model, a sensitivity of the primary model, an F1 score of the primary model, a mean absolute score of the primary model, a mean squared error of the primary model, and/or the like. The risk assessor may receive the metadata and the relationships from the data transformer and the user profiler model. The metadata and the relationships may include data identifying an attacker exploiting an API or chaining of APIs, an attacker utilizing a vulnerability, health impacting attacks, single device multiple attacks, similar attack multiple devices, attacker intent groups, accuracy deviations (e.g., data poisoning or model manipulations), inconsistent behavior modeling, omnichannel inconsistent user footprints, and/or the like.

Based on the risk score from the risk assessor, the insights and NBA monitor may highlight transactions to indicate legitimate and fraudulent transactions. The risk category may aid in generating a next best action and additional actions, such as approve future transactions (e.g., low risk), review future transactions manually (e.g., medium risk), or decline the transactions (e.g., high risk). These decisions may be marked and may be provided to the self-healer for future courses of decision-making in real-time. The different metadata and relationships may be provided as a dashboard identifying the suspicious transactions.

Based on the risk category and next best actions, the self-healer may automatically apply a rule in real-time, and may add additional validations before approving the transaction. The self-healer may also request further information from customers, and may place a hold on transactions pending further review. The scheduler may perform time-bound checks for analyzing specific threat behavior using the fraud. The risk whistler may include an alerting system that communicates anomalies and risk categories to the stakeholders, with mitigation steps considered. The risk whistler may also highlight pending approvals from the respective stakeholders for further review.

As further shown in FIG. 1A, and by reference number 115, the fraud system 110 may perform adversarial training of a fraud model based on a primary model and with different training data than used to train the primary model. For example, the fraud system 110 may utilize training data that differs from a data set used to train the primary model to account for different potential attacks and anomalies. The adversarial training may strengthen a capability of the fraud model to detect and reject malicious inputs that exploit vulnerabilities of the primary model. Additionally, or alternatively, the fraud system 110 may provide adversarial training for the fraud model by utilizing a heterogeneous set of data, different from the primary model training data, to bolster the fraud model against diverse cyber threats. For example, varied input patterns may be utilized to train the fraud model to recognize and react efficiently to multiple attack vectors. Additionally, or alternatively, the fraud system 110 may utilize diverse adversarial training datasets that introduce various attack scenarios, thereby fortifying the fraud model against attempts to compromise the primary model. The alternative training data can simulate different attack strategies to provide a broader defense scope by the fraud model.

In some implementations, the fraud system 110 may train the fraud model based on the primary model, with deviations in training data and with a different LLM with a different transformer and hyperparameters. The fraud system 110 may provide adversarial training of the fraud model against cyberattacks, such as jailbreaking, trigger insertion, OWASP threats, STRIDE threats, backdoor attacks, FGSM, PGD, and/or the like. The adversarial training may be applied to most consumer-based applications to ensure that the fraud model provides accurate recommendations, price predictions, text-based searches, and/or the like.

As further shown in FIG. 1A, and by reference number 120, the fraud system 110 may receive, from a user, a request for the primary model to generate a prediction. For example, the user may interact with the user device 105 to generate the request for the primary model. The user device 105 may provide the request to the fraud system 110, and the fraud system 110 may receive the request. The fraud system 110 may process the request to ensure that the request is legitimate before allowing the primary model to generate the desired prediction. In one example, the request may include a request for the primary model to generate recommendations, price predictions, text-based searches, and/or the like.

As shown in FIG. 1B, and by reference number 125, the fraud system 110 may authenticate the request and may cause the request to be processed by the primary model for generation of a primary model prediction. For example, upon receiving the request for the primary model prediction, the fraud system 110 may validate the request to ensure authenticity before the request is processed by the primary model. This may include checking the user's credentials and specifics of the request to prevent unauthorized access or misuse. Additionally, or alternatively, the fraud system 110 may handle incoming requests from user devices 105 for primary model predictions, and may ensure that these requests are verified for legitimacy prior to primary model engagement. The validation of the request may act as an initial security layer to filter out potential threats. Additionally, or alternatively, the fraud system 110 may intercept user-originated requests aimed at garnering predictions from the primary model, and may subject the requests to an initial validation phase to prevent fraudulent activities. The fraud system 110 may implement extra validation layers, such as multi-factor authentication, transaction analysis, or historical behavior analysis, to authenticate the requests.

In some implementations, the fraud system 110 may invalidate the request and may not process the request for the primary model. In such implementations, the fraud system 110 may return a rejection message to the user device 105 indicating the request as fraudulent or may further investigate the user and/or the user device 105 for fraudulent activity. Alternatively, the fraud system 110 may validate the request, and may process the request, with the primary model, to generate the primary model prediction. For example, the fraud system 110 may provide the request to the primary model, and the primary model may process the request and generate prediction results (e.g., the primary model prediction). In one example, the primary model may generate recommendations, price predictions, text-based searches, and/or the like based on the request.

As shown in FIG. 1C, and by reference number 130, the fraud system 110 may process the request, with the fraud model, to generate a fraud model prediction. For example, the fraud system 110 may utilize the adversarial trained fraud model to generate the fraud model prediction based on the request. The fraud model prediction may identify any anomalous patterns which may not align with an expected output of a genuine request, thereby isolating potential fraud attempts. In some implementations, the fraud model may perform an initial pre-screening of the request to detect any overt signs of fraudulence or anomalies. The pre-screening may act as a preliminary filter to catch easily identifiable fraudulent characteristics, thereby reducing load on more complex fraud detection mechanisms. Additionally, or alternatively, the fraud model may apply different layers of security checks to the request, and may generate a fraud model prediction that identifies any suspicious activity associated with the request.

Additionally, or alternatively, the fraud system 110 may classify the request based on urgency or risk level. This may enable the fraud system 110 to decide whether the request requires immediate fraud detection or can undergo standard processing, thereby optimizing resource allocation. Additionally, or alternatively, the fraud model may cross-reference the request against historical data of similar transactions. The fraud model may utilize pattern recognition to identify potential fraud based on context from past data. Additionally, or alternatively, the fraud model may utilize a multi-phase evaluation, where the request is initially analyzed through simpler models before being subjected to the more complex models. A multi-phase evaluation may improve efficiency by ensuring that only those requests needing deeper analysis are processed by the fraud model. Additionally, or alternatively, the fraud model may utilize dynamic updating models that incorporate real-time threat intelligence feeds to adapt the fraud model's decision parameters. This may ensure that the fraud model remains current and effective against evolving threats.

Additionally, or alternatively, the fraud model may interact with external threat detection systems or databases to enrich the fraud model's insights during the fraud model prediction process. Additionally, or alternatively, the fraud model may incorporate feedback loops where outcomes of prior fraud checks are used to continually refine and improve the fraud model's accuracy and efficiency in prediction. Additionally, or alternatively, the fraud model may identify transaction context, such as geographic location and user device type, to flag any unusual patterns before generating the fraud model prediction. In some implementations, the fraud model may utilize heterogeneous data sets to fortify against various attack vectors specific to the primary model. For example, the fraud model may include data patterns simulating adversarial inputs which have historically been used to compromise similar primary models, thereby enabling the fraud system 110 to generate a fraud model prediction that is tailored to such threats.

Figure 1D:
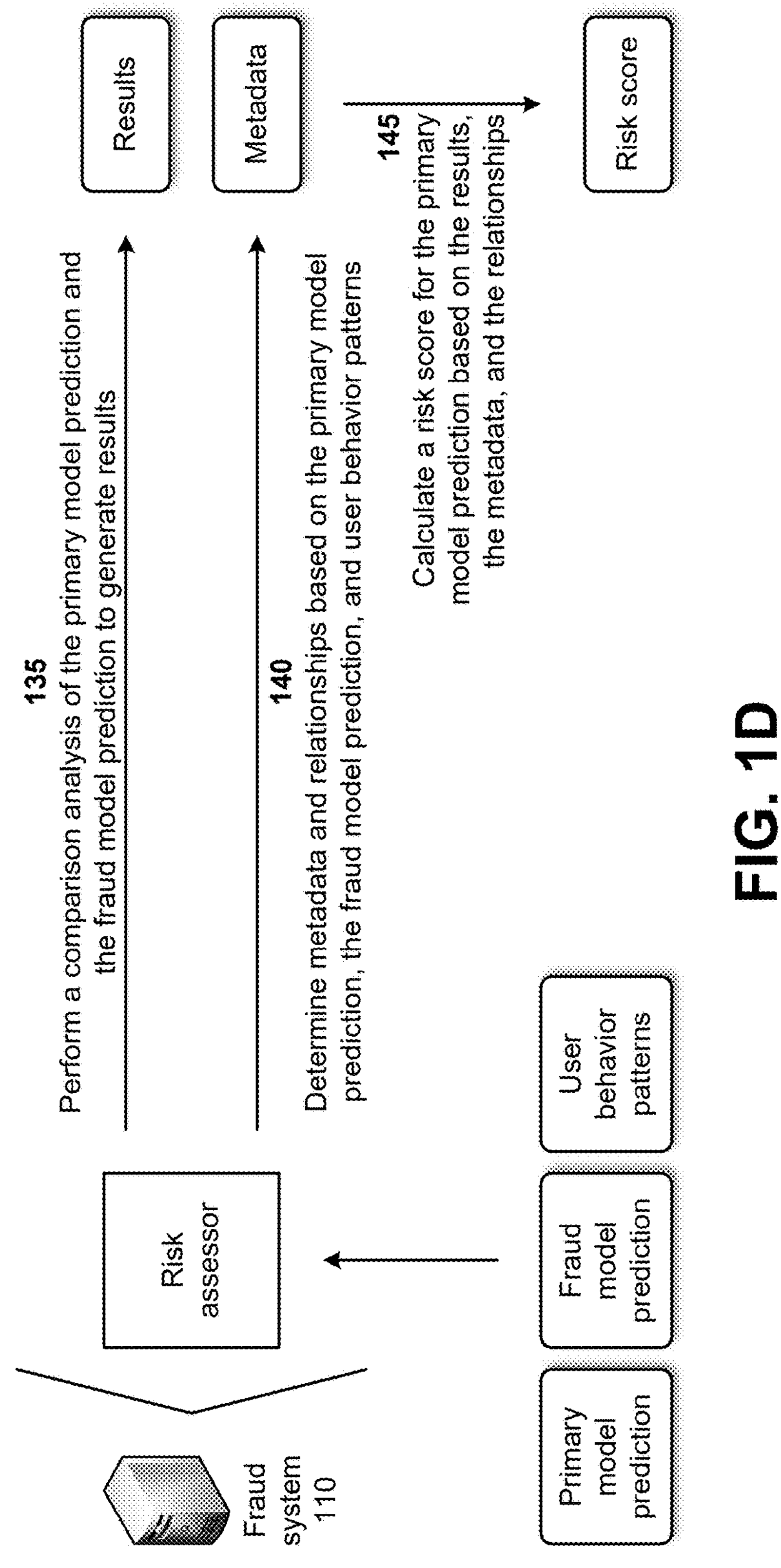

As shown in FIG. 1D, and by reference number 135, the fraud system 110 may perform a comparison analysis of the primary model prediction and the fraud model prediction to generate results. For example, the fraud system 110 may analyze and compare the primary model prediction and the fraud model prediction using canonical correlation techniques to identify any relationships or discrepancies between those two sets of predictions. This analysis may aid in understanding how the fraud model prediction aligns with or differs from the primary model prediction. In some implementations, the fraud system 110 may perform the canonical correlation analysis of the primary model prediction and the fraud model prediction to generate insight-rich metrics. This may involve utilizing statistical methods to measure a degree of association between the primary model prediction and the fraud model prediction, providing a deeper understanding of their interdependencies. In some implementations, the fraud system 110 may utilize a principal component analysis, a partial least squares analysis, a multiple correspondence analysis, a multidimensional scaling analysis, a factor analysis, a linear discriminant analysis, a redundancy analysis, and/or the like for the comparison analysis.

Additionally, or alternatively, the fraud system 110 may utilize the canonical correlation analysis to evaluate any discrepancies or alignments between the primary model prediction and the fraud model prediction. This evaluation may enable the fraud system 110 to pinpoint specific areas where the primary model and the fraud model agree or diverge, which may be utilized for fraud detection. Additionally, or alternatively, the fraud system 110 may utilize the canonical correlation analysis to understand and quantify the relationship between the primary model prediction and the fraud model prediction. By doing so, the fraud system 110 may effectively model the interactions and predict potential fraud scenarios.

As further shown in FIG. 1D, and by reference number 140, the fraud system 110 may determine metadata and relationships based on the primary model prediction, the fraud model prediction, and user behavior patterns. For example, the fraud system 110 may extract and examine metadata associated with the primary model prediction and the fraud model prediction, as well as use historical user behavior patterns. The metadata can include a variety of information, such as user interaction logs, transaction details, device fingerprints, telemetry data, and/or the like. The fraud system 110 may utilize the compiled metadata in conjunction with the comparison results to understand the context and interrelationships between user activities and the predictions of both models. In some implementations, the fraud system 110 may extract the metadata and may establish interrelationships between the primary model prediction, the fraud model prediction, and historical user activity based on the metadata. This may include the fraud system 110 collecting data traces from past user engagements to form a comprehensive view that aids in predicting fraudulent behavior. Additionally, or alternatively, by analyzing the metadata and user behavior patterns, the fraud system 110 may assess context around the primary model prediction and the fraud model prediction. This contextual analysis may aid the fraud system 110 in determining more informed decisions by considering a broader environment in which these predictions occur.

In some implementations, the metadata and the relationships may include data identifying an attacker exploiting an API or chaining of APIs, an attacker utilizing a vulnerability, health impacting attacks, single device multiple attacks, similar attack multiple devices, attacker intent groups, accuracy deviations (e.g., data poisoning or model manipulations), inconsistent behavior modeling, omnichannel inconsistent user footprints, and/or the like. In some implementations, the user behavior patterns may include patterns associated with user interactions (e.g., login history, actions performed, telemetry information, and/or the like), user demographics, and user profile information. The fraud system 110 may convert the user behavior patterns into numerical embeddings that capture user behavior patterns. The numerical embeddings may serve as inputs for assessing and predicting a legitimacy of a prompt of the primary model.

As further shown in FIG. 1D, and by reference number 145, the fraud system 110 may calculate a risk score for the primary model prediction based on the results, the metadata, and the relationships. For example, the fraud system 110 may integrate the results of the comparison analysis, the comprehensive metadata, and the identified relationships to compute the risk score for the primary model prediction. The risk score may represent a likelihood of the primary model prediction being legitimate or fraudulent. A higher risk score may indicate a higher probability of fraud, prompting further actions by the fraud system 110, such as flagging the transaction for review or rejecting the transaction outright. Additionally, or alternatively, the fraud system 110 may evaluate the risk score to quantify a likelihood of primary model prediction being fraudulent, using the comprehensive metadata and user behavior data.

In some implementations, the risk score may be in a range of 0-1, with 0.1-0.3 indicating a high-risk transaction, 0.4-0.8 indicating a low-risk transaction, and 0.9-1.0 indicating a legitimate transaction. Those of ordinary skill in the art will recognize that the ranges are provided merely as examples, and do not limit the full range of implementations described in this disclosure. The fraud system 110 may compare the risk score against predefined risk thresholds, and may categorize the risk (e.g., low risk, medium risk, or high risk) based on the comparison. The fraud system 110 may also receive health parameters of the primary model. The health parameters may include an accuracy of the primary model, a precision of the primary model, a sensitivity of the primary model, an F1 score of the primary model, a mean absolute score of the primary model, a mean squared error of the primary model, and/or the like. In some implementations, the fraud system 110 may utilize the health parameters, with the comparison results, the metadata, and the relationships, to calculate the risk score for the primary model prediction.

As shown in FIG. 1E, and by reference number 150, the fraud system 110 may determine whether the primary model prediction is fraudulent or legitimate based on the risk score. For example, the fraud system 110 may analyze the risk score to assess a likelihood of the primary model prediction being fraudulent. In some implementations, the risk score may range from 0 to 1, where lower scores (0.1-0.3) indicate high risk and potential fraud, and higher scores (0.9-1.0) indicate legitimate transactions. Alternatively, a risk score of less than 0.2 may indicate a high risk and potential fraud, a risk score between 0.2 and 0.4 may indicate a potential fraud that may require monitoring, and a risk score of greater than 0.4 may indicate legitimate transactions. The fraud system 110 may compare the computed risk score against predefined risk thresholds and may categorize the primary model prediction as fraudulent or legitimate based on the comparison.

In some implementations, the fraud system 110 may store the risk score for subsequent analysis and reporting. This allows for long-term tracking and monitoring of risk assessment trends to enhance future predictions. Additionally, or alternatively, the fraud system 110 may utilize the risk score to trigger additional authentication steps before the primary model prediction is processed. For example, a flagged high-risk prediction might prompt further validation through user verification or additional security checks. Additionally, or alternatively, the fraud system 110 may further analyze metadata and identified relationships to refine the accuracy of the risk score for the primary model prediction. This may involve deeper analysis into transaction history, user behavior, and other contextual factors to improve precision.

Additionally, or alternatively, the fraud system 110 may utilize machine learning models to enhance the precision of the risk score calculation, taking into account historical data and user behavior patterns. This may include using advanced models to continuously learn from past data and improve future risk predictions. Additionally, or alternatively, the fraud system 110 may predict potential future fraudulent actions based on current risk assessments. By identifying patterns that may indicate future fraud, the fraud system 110 may proactively implement preventive measures. Additionally, or alternatively, the fraud system 110 may categorize risk scores into multiple levels beyond just fraudulent or legitimate, such as low, medium, and high risk. This may provide for more nuanced decision-making and targeted actions.

Figure 1F:
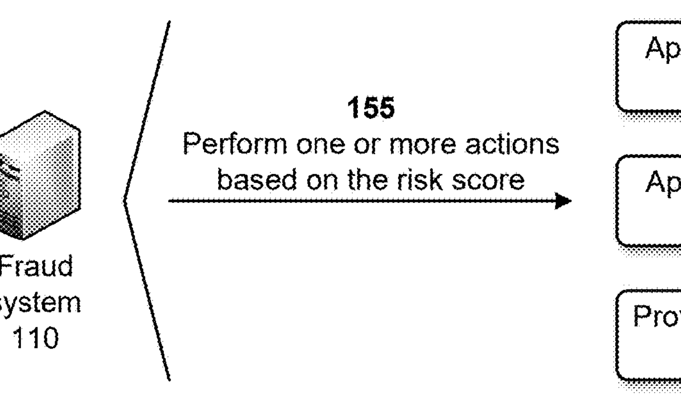

As shown in FIG. 1F, and by reference number 155, the fraud system 110 may perform one or more actions based on the risk score. In some implementations, performing the one or more actions includes the fraud system 110 obfuscating, rejecting, or accepting the primary model prediction based on the risk score. For example, the fraud system 110 may obfuscate the primary model prediction based on the risk score being between 0.2 and 0.4. Obfuscating the primary model prediction may include masking or distorting the prediction that is flagged as potentially fraudulent to prevent misuse. Alternatively, the fraud system 110 may reject the primary model prediction based on the risk score being less than 0.2. Rejecting the prediction may include completely disallowing the action or decision suggested by the primary model due to the associated risk. Alternatively, the fraud system 110 may accept the primary model prediction based on the risk score being greater than 0.4. Accepting the prediction occurs when it is determined that the associated risk is minimal or manageable. In this way, the fraud system 110 conserves computing resources, networking resources, and/or other resources that would have otherwise been consumed by failing to stop the sophisticated AI-assisted cyber threats from compromising machine learning models.

In some implementations, performing the one or more actions includes the fraud system 110 approving, reviewing, or declining future predictions by the primary model based on the risk score. For example, the fraud system 110 may approve future predictions by the primary model based on the risk score. Approving future predictions may streamline decision-making processes for low-risk scenarios. Alternatively, the fraud system 110 may review future predictions by the primary model based on the risk score. Reviewing may include conducting a more detailed analysis of future predictions that fall in a medium-risk category. Alternatively, the fraud system may decline future predictions by the primary model based on the risk score. Declining may ensure that potentially harmful or inaccurate predictions are not permitted to proceed. In this way, the fraud system 110 conserves computing resources, networking resources, and/or other resources that would have otherwise been consumed by generating erroneous predictions with the compromised machine learning models.

In some implementations, performing the one or more actions includes the fraud system 110 approving, reviewing, or declining future requests from the user based on the risk score. For example, the fraud system 110 may accept future requests from the user based on the risk score. Approval may provide for uninterrupted service for low-risk users. Alternatively, the fraud system 110 may review future requests from the user based on the risk score. Reviews may include a secondary manual or automated verification process before the request is processed. Alternatively, the fraud system 110 may decline future requests from the user based on the risk score. Declining such future requests prevents requests from high-risk users from being processed. In this way, the fraud system 110 conserves computing resources, networking resources, and/or other resources that would have otherwise been consumed by failing to stop the sophisticated AI-assisted cyber threats from compromising machine learning models.

In some implementations, performing the one or more actions includes the fraud system 110 providing a notification to a stakeholder of the primary model based on the risk score. For example, the notification provided to a stakeholder may include details highlighting the specific risk score and associated factors. Additionally, or alternatively, the fraud system 110 may provide suggestions on risk mitigation strategies along with the notification. Additionally, or alternatively, detailed logs of all interactions flagged with high-risk scores can be included in the notification for transparency. In this way, the fraud system 110 conserves computing resources, networking resources, and/or other resources that would have otherwise been consumed by failing to stop the sophisticated AI-assisted cyber threats from compromising machine learning models.

In some implementations, performing the one or more actions includes the fraud system 110 retraining the primary model and/or the fraud model based on the risk score. For example, the fraud system 110 may utilize the risk score as additional training data for retraining the primary model and/or the fraud model, thereby increasing the quantity of training data available for training the primary model and/or the fraud model. Accordingly, the fraud system 110 may conserve computing resources associated with identifying, obtaining, and/or generating historical data for training the primary model and/or the fraud model relative to other systems for identifying, obtaining, and/or generating historical data for training machine learning models.

In one example, the fraud system 110 may be utilized to identify and filter suspicious API access, and to provide responses in real time. An artificial intelligence-assisted hackbot may utilize a list of compromised devices (e.g., bot-nets) and may use Internet protocol (IP) addresses of those devices to do an account takeover or to access an API in a fraudulent way. This sophisticated attack may not be caught by quota/spike limits and may not be detected in managed security protection policies configured by a cloud service provider, since the hackbot knows a quantity of valid attempts that will succeed in the system to navigate through the API layer. The fraud system 110 may train a fraud model to classify the API requests as legitimate or fraudulent based on features, such as input features (e.g., IP address, request headers, device fingerprint, payload, time, and/or the like), target variables (e.g., legitimate or fraudulent), and/or the like. The fraud model may identify unusual patterns of API requests that may indicate fraud. The fraud model may assign a risk score for each transaction. In order to do this, output predictions of the primary model may be provided to the fraud model. The fraud model may be trained with a scientific computation model that predicts whether a transaction is fraudulent.

In this way, the fraud system 110 provides a fraud model for proactively preventing attacks on machine learning models. For example, the fraud system 110 may provide real-time analysis of potential threats or anomalies to a primary model (e.g., a machine learning model potentially under attack) based on comparing predictions from the primary model and predictions from the fraud model. The fraud system 110 may utilize user behavior patterns and metadata for enhanced risk assessment, which serves to maintain integrity and predictive accuracy of the primary model in the face of advanced cyber threats. The fraud system 110 may preserve computational integrity of the primary model, may prevent unauthorized manipulations of the primary model, and may avert excessive resource drain caused by threat mitigation and recovery processes. The fraud system 110 may reject or accept primary model predictions based on a risk assessment, and may apply corrective actions to the primary model based on the risk assessment. Thus, the fraud system 110 may conserve computing resources, networking resources, and/or other resources that would have otherwise been consumed by failing to stop the sophisticated AI-assisted cyber threats from compromising machine learning models, retraining the compromised machine learning models, handling customer complaints associated with downtime for the compromised machine learning models, generating erroneous predictions with the compromised machine learning models, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
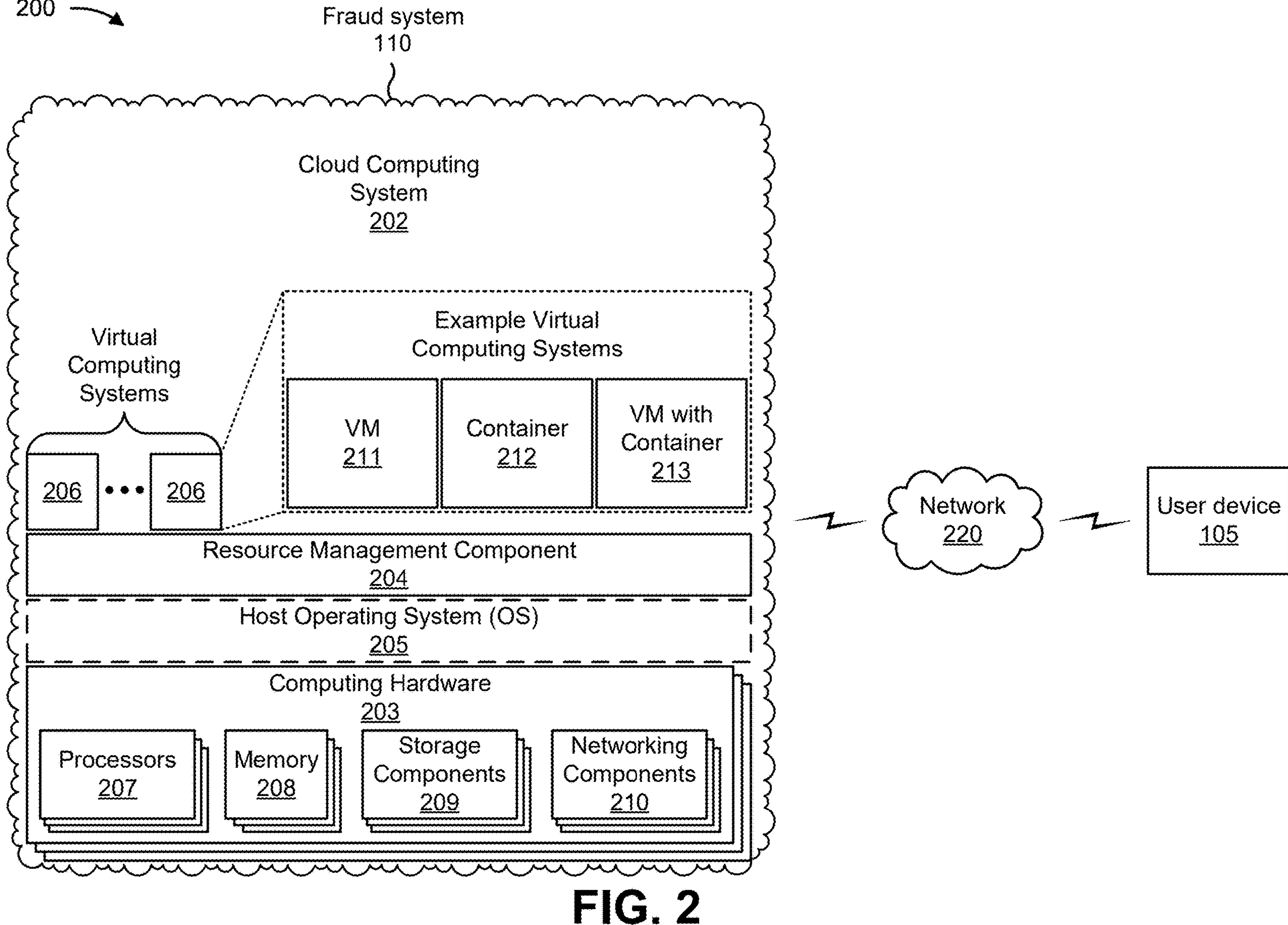
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the fraud system 110, which may include one or more elements of and/or may execute within a cloud computing system 202. The cloud computing system 202 may include one or more elements 203-213, as described in more detail below. As further shown in FIG. 2, the environment 200 may include the user device 105 and/or a network 220. Devices and/or elements of the environment 200 may interconnect via wired connections and/or wireless connections.

The user device 105 may include one or more devices capable of receiving, generating, storing, processing, and/or providing information, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), a virtual assistant device, or a similar type of device.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the fraud system 110 may include one or more elements 203-213 of the cloud computing system 202, may execute within the cloud computing system 202, and/or may be hosted within the cloud computing system 202, in some implementations, the fraud system 110 may not be cloud-based (e.g., may be implemented outside of a cloud computing system) or may be partially cloud-based. For example, the fraud system 110 may include one or more devices that are not part of the cloud computing system 202, such as the device 300 of FIG. 3, which may include a standalone server or another type of computing device. The fraud system 110 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
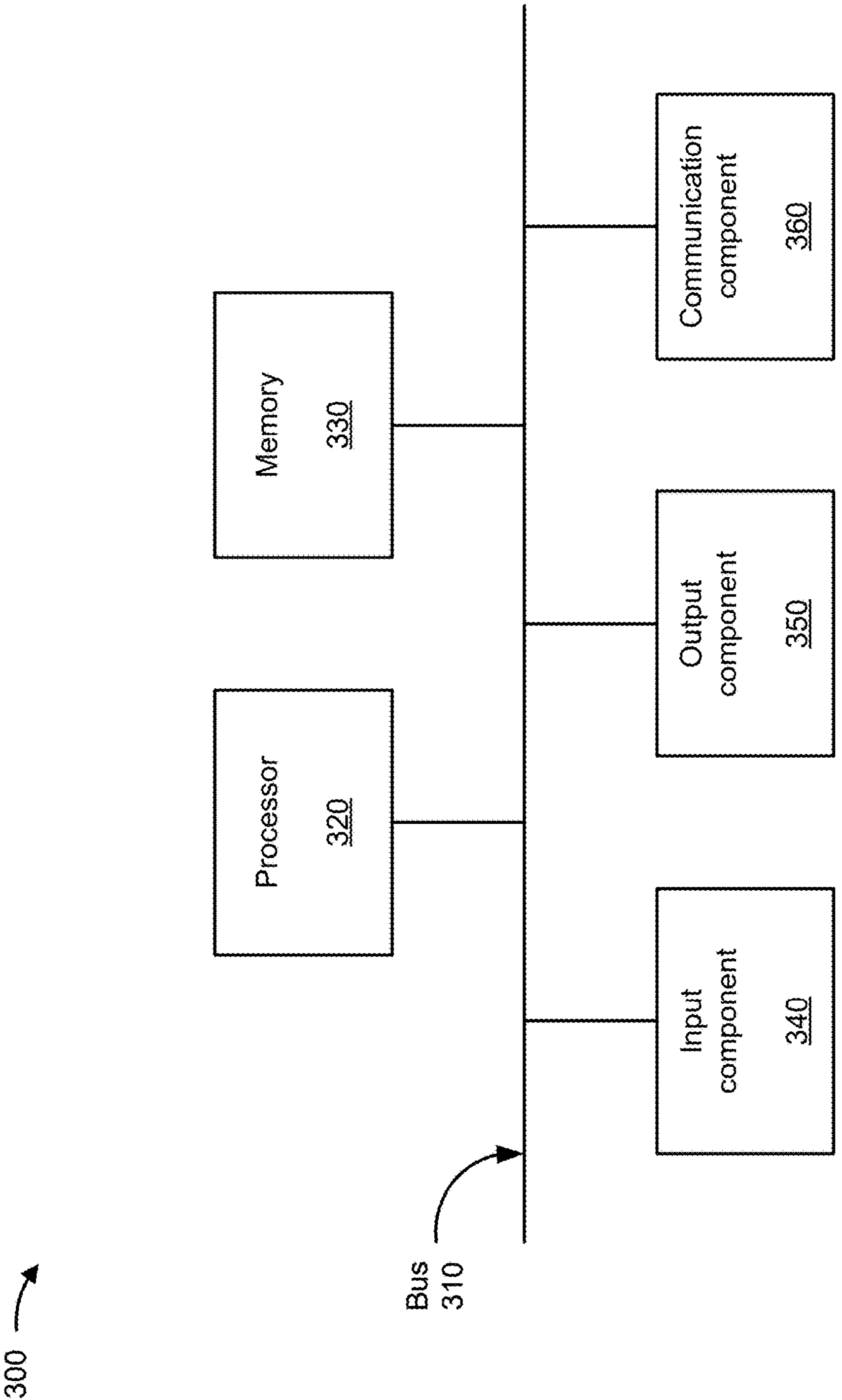
FIG. 3 is a diagram of example components of one or more devices of FIG. 2.

FIG. 3 is a diagram of example components of a device 300, which may correspond to the user device 105 and/or the fraud system 110. In some implementations, the user device 105 and/or the fraud system 110 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
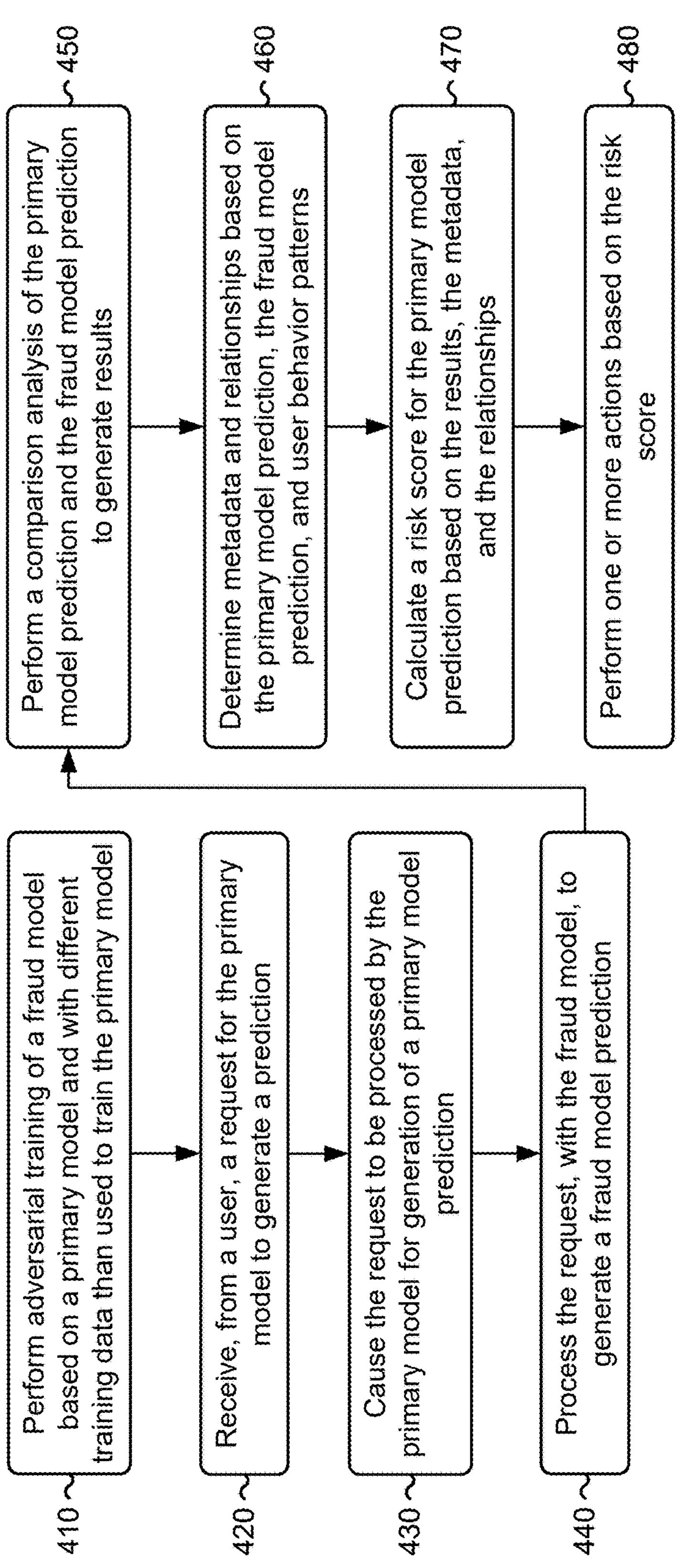
FIG. 4 is a flowchart of an example process for providing a fraud model for proactively preventing attacks on machine learning models.

FIG. 4 is a flowchart of an example process 400 for providing a fraud model for proactively preventing attacks on machine learning models. In some implementations, one or more process blocks of FIG. 4 may be performed by a device (e.g., the fraud system 110). In some implementations, one or more process blocks of FIG. 4 may be performed by another device or a group of devices separate from or including the device, such as a user device (e.g., the user device 105). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include performing adversarial training of a fraud model based on a primary model and with different training data than used to train the primary model (block 410). For example, the device may perform adversarial training of a fraud model based on a primary model and with different training data than used to train the primary model, as described above.

As further shown in FIG. 4, process 400 may include receiving, from a user, a request for the primary model to generate a prediction (block 420). For example, the device may receive, from a user, a request for the primary model to generate a prediction, as described above.

As further shown in FIG. 4, process 400 may include causing the request to be processed by the primary model for generation of a primary model prediction (block 430). For example, the device may cause the request to be processed by the primary model for generation of a primary model prediction, as described above.

As further shown in FIG. 4, process 400 may include processing the request, with the fraud model, to generate a fraud model prediction (block 440). For example, the device may process the request, with the fraud model, to generate a fraud model prediction, as described above.

As further shown in FIG. 4, process 400 may include performing a comparison analysis of the primary model prediction and the fraud model prediction to generate results (block 450). For example, the device may perform a comparison analysis of the primary model prediction and the fraud model prediction to generate results, as described above. In some implementations, the comparison analysis is a canonical covariance analysis.

As further shown in FIG. 4, process 400 may include determining metadata and relationships based on the primary model prediction, the fraud model prediction, and user behavior patterns (block 460). For example, the device may determine metadata and relationships based on the primary model prediction, the fraud model prediction, and user behavior patterns, as described above. In some implementations, the metadata includes data identifying one or more of user behavior, user interactions, transaction logs, error logs, telemetry, and application programming interface logs.

As further shown in FIG. 4, process 400 may include calculating a risk score for the primary model prediction based on the results, the metadata, and the relationships (block 470). For example, the device may calculate a risk score for the primary model prediction based on the results, the metadata, and the relationships, as described above. In some implementations, the risk score represents a likelihood of anomalies or threats associated with the primary model.

As further shown in FIG. 4, process 400 may include performing one or more actions based on the risk score (block 480). For example, the device may perform one or more actions based on the risk score, as described above. In some implementations, performing the one or more actions includes one or more of obfuscating the primary model prediction based on the risk score, rejecting the primary model prediction based on the risk score, or accepting the primary model prediction based on the risk score. In some implementations, performing the one or more actions includes one or more of approving future predictions by the primary model based on the risk score, reviewing future predictions by the primary model based on the risk score, or declining future predictions by the primary model based on the risk score.

In some implementations, performing the one or more actions includes one or more of approving future requests from the user based on the risk score, reviewing future requests from the user based on the risk score, or declining future requests from the user based on the risk score. In some implementations, performing the one or more actions includes one or more of providing a notification to a stakeholder of the primary model based on the risk score, or retraining one or more of the primary model or the fraud model based on the risk score. In some implementations, performing the one or more actions includes implementing corrective actions for the primary model based on the risk score.

In some implementations, process 400 includes authenticating the request prior to causing the request to be processed by the primary model. In some implementations, process 400 includes determining whether the primary model prediction is fraudulent or legitimate based on the risk score, and selectively rejecting the primary model prediction based on determining that the primary model prediction is fraudulent, or accepting the primary model prediction based on determining that the primary model prediction is legitimate.

In some implementations, process 400 includes identifying anomalies associated with the primary model based on the risk score, and adjusting predictions of the primary machine learning model based on the anomalies. In some implementations, process 400 includes monitoring health metrics of the primary model, wherein the health metrics include one or more of an accuracy, a precision, a sensitivity, an F1 score, a mean absolute error, or a mean squared error. In some implementations, process 400 includes determining that the primary model prediction is fraudulent based on the risk score exceeding a risk threshold.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code-it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
performing, by a device, adversarial training of a fraud model based on a primary model and with different training data than used to train the primary model;
receiving, by the device and from a user, a request for the primary model to generate a prediction;
causing, by the device, the request to be processed by the primary model for generation of a primary model prediction;
processing, by the device, the request, with the fraud model, to generate a fraud model prediction;
performing, by the device, a canonical covariance analysis of the primary model prediction and the fraud model prediction to generate results;
determining, by the device, metadata and relationships based on the primary model prediction, the fraud model prediction, and user behavior patterns;
calculating, by the device, a risk score for the primary model prediction based on the results, the metadata, and the relationships; and
performing, by the device, one or more actions based on the risk score.

2. The method of claim 1, further comprising:
determining whether the primary model prediction is fraudulent or legitimate based on the risk score; and selectively:
rejecting the primary model prediction based on determining that the primary model prediction is fraudulent, or
accepting the primary model prediction based on determining that the primary model prediction is legitimate.

3. The method of claim 1, further comprising:
identifying anomalies associated with the primary model based on the risk score; and
adjusting predictions of the primary model based on the anomalies.

4. The method of claim 1, further comprising:
monitoring health metrics of the primary model,
wherein the health metrics include one or more of an accuracy, a precision, a sensitivity, an F1 score, a mean absolute error, or a mean squared error.

5. The method of claim 1, further comprising:
determining that the primary model prediction is fraudulent based on the risk score exceeding a risk threshold.

6. The method of claim 1, wherein performing the one or more actions comprises one or more of:
obfuscating, rejecting, or accepting the primary model prediction based on the risk score;
approving, reviewing, or declining future predictions by the primary model based on the risk score;
approving, reviewing, or declining future requests from the user based on the risk score;
providing a notification to a stakeholder of the primary model based on the risk score; or
retraining one or more of the primary model or the fraud model based on the risk score.

7. A device, comprising:
one or more processors configured to:
receive, from a user, a request for a primary model to generate a prediction;
cause the request to be processed by the primary model for generation of a primary model prediction;
process the request, with a fraud model, to generate a fraud model prediction,
wherein adversarial training is performed on the fraud model based on the primary model and with different training data than used to train the primary model;
perform a canonical covariance analysis of the primary model prediction and the fraud model prediction to generate results;
determine metadata and relationships based on the primary model prediction, the fraud model prediction, and user behavior patterns;
calculate a risk score for the primary model prediction based on the results, the metadata, and the relationships; and
perform one or more actions based on the risk score.

8. The device of claim 7, wherein the risk score represents a likelihood of anomalies or threats associated with the primary model.

9. The device of claim 7, wherein the one or more processors are further configured to:
identify anomalies associated with the primary model based on the risk score; and
adjust predictions of the primary model based on the anomalies.

10. The device of claim 7, wherein the metadata includes data identifying one or more of user behavior, user interactions, transaction logs, error logs, telemetry, and application programming interface logs.

11. The device of claim 7, wherein the one or more processors are further configured to:
monitor health metrics of the primary model,
wherein the health metrics include one or more of an accuracy, a precision, a sensitivity, an F1 score, a mean absolute error, or a mean squared error.

12. The device of claim 7, wherein the one or more processors are further configured to:
determine that the primary model prediction is fraudulent based on the risk score exceeding a risk threshold.

13. The device of claim 7, wherein the one or more processors, to perform the one or more actions, are configured to:
implement corrective actions for the primary model based on the risk score.

14. A non-transitory computer-readable medium storing a set of instructions, the set of instructions comprising:
one or more instructions that, when executed by one or more processors of a device, cause the device to:
perform adversarial training of a fraud model based on a primary model and with different training data than used to train the primary model;
receive, from a user, a request for the primary model to generate a prediction;
cause the request to be processed by the primary model for generation of a primary model prediction;
process the request, with the fraud model, to generate a fraud model prediction;
perform a canonical covariance analysis of the primary model prediction and the fraud model prediction to generate results;
determine metadata and relationships based on the primary model prediction, the fraud model prediction, and user behavior patterns;

calculate a risk score for the primary model prediction based on the results, the metadata, and the relationships, wherein the risk score represents a likelihood of anomalies or threats associated with the primary model; and perform one or more actions based on the risk score.

15. The non-transitory computer-readable medium of claim 14, wherein the one or more instructions further cause the device to:

determine whether the primary model prediction is fraudulent or legitimate based on the risk score; and selectively:

reject the primary model prediction based on determining that the primary model prediction is fraudulent, or accept the primary model prediction based on determining that the primary model prediction is legitimate.

16. The non-transitory computer-readable medium of claim 14, wherein the one or more instructions, that cause the device to perform the one or more actions, cause the device to perform one or more of:

obfuscate the primary model prediction based on the risk score;

reject the primary model prediction based on the risk score;

accept the primary model prediction based on the risk score;

approve future predictions by the primary model based on the risk score;

review future predictions by the primary model based on the risk score; or decline future predictions by the primary model based on the risk score.

17. The non-transitory computer-readable medium of claim 14, wherein the one or more instructions, that cause the device to perform the one or more actions, cause the device to perform one or more of:

approve future requests from the user based on the risk score;

review future requests from the user based on the risk score;

decline future requests from the user based on the risk score;

provide a notification to a stakeholder of the primary model based on the risk score; or retrain one or more of the primary model or the fraud model based on the risk score.

18. The non-transitory computer-readable medium of claim 14, wherein the one or more instructions further cause the device to:

identify anomalies associated with the primary model based on the risk score; and adjust predictions of the primary model based on the anomalies.

19. The non-transitory computer-readable medium of claim 14, wherein the one or more instructions further cause the device to:

monitor health metrics of the primary model, wherein the health metrics include one or more of an accuracy, a precision, a sensitivity, an F1 score, a mean absolute error, or a mean squared error.

20. The non-transitory computer-readable medium of claim 14, wherein the one or more instructions further cause the device to implement corrective actions for the primary model based on the risk score.

* * * * *